United States Patent [19]
Movsesian

[11] Patent Number: 5,413,454
[45] Date of Patent: May 9, 1995

[54] MOBILE ROBOTIC ARM

[76] Inventor: Peter Movsesian, 17844 Toivabe, Fountain Valley, Calif. 92708

[21] Appl. No.: 89,016

[22] Filed: Jul. 9, 1993

[51] Int. Cl.⁶ .............................................. B25J 5/00
[52] U.S. Cl. ..................................... 414/729; 294/100; 294/116; 901/1; 901/15; 901/25; 901/39; 414/722
[58] Field of Search ............... 414/729, 738, 722, 680; 212/187, 188; 294/100, 116; 901/1, 15, 23, 24, 25, 36–39, 47

[56] References Cited

U.S. PATENT DOCUMENTS

| 3,253,716 | 5/1966 | Stratton | 212/188 |
|---|---|---|---|
| 3,262,593 | 7/1966 | Hainer | 214/651 |
| 3,576,342 | 4/1971 | Page | 294/100 X |
| 3,945,449 | 3/1976 | Ostrow | 180/6.5 |
| 4,351,553 | 8/1982 | Rovetta et al. | 294/106 |
| 4,483,407 | 11/1984 | Iwamoto et al. | 901/1 X |
| 4,932,831 | 6/1990 | White et al. | 414/732 |

FOREIGN PATENT DOCUMENTS

| 2239411 | 2/1975 | France | 212/188 |
|---|---|---|---|
| 0140757 | 12/1978 | Japan | 212/187 |
| 2041879 | 9/1980 | United Kingdom . | |

Primary Examiner—Donald W. Underwood
Attorney, Agent, or Firm—Stetina Brunda & Buyan

[57] ABSTRACT

This invention relates to a mobile robotic arm which is adapted to grasp objects at low-level, intermediate level and high reach areas of a domestic dwelling. The device generally comprises a mobile base having a robotic arm rotatably and pivotally connected thereto. The robotic arm comprises lower arm, mid-arm, and forearm components which are pivotally interconnected and selectively extensible and retractable through the utilization of a controller which is preferably disposed upon an arm rest portion of a wheelchair.

6 Claims, 5 Drawing Sheets

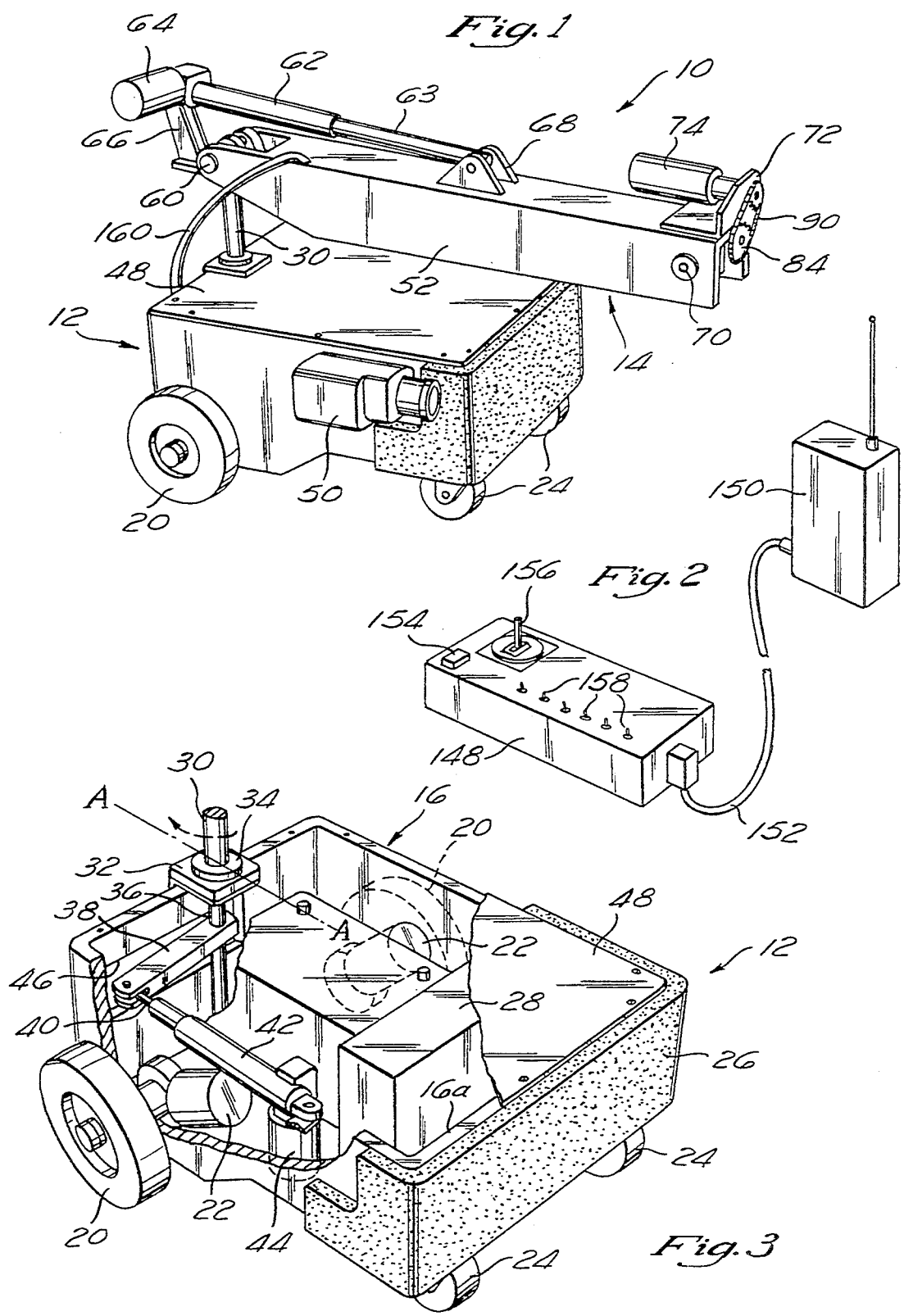

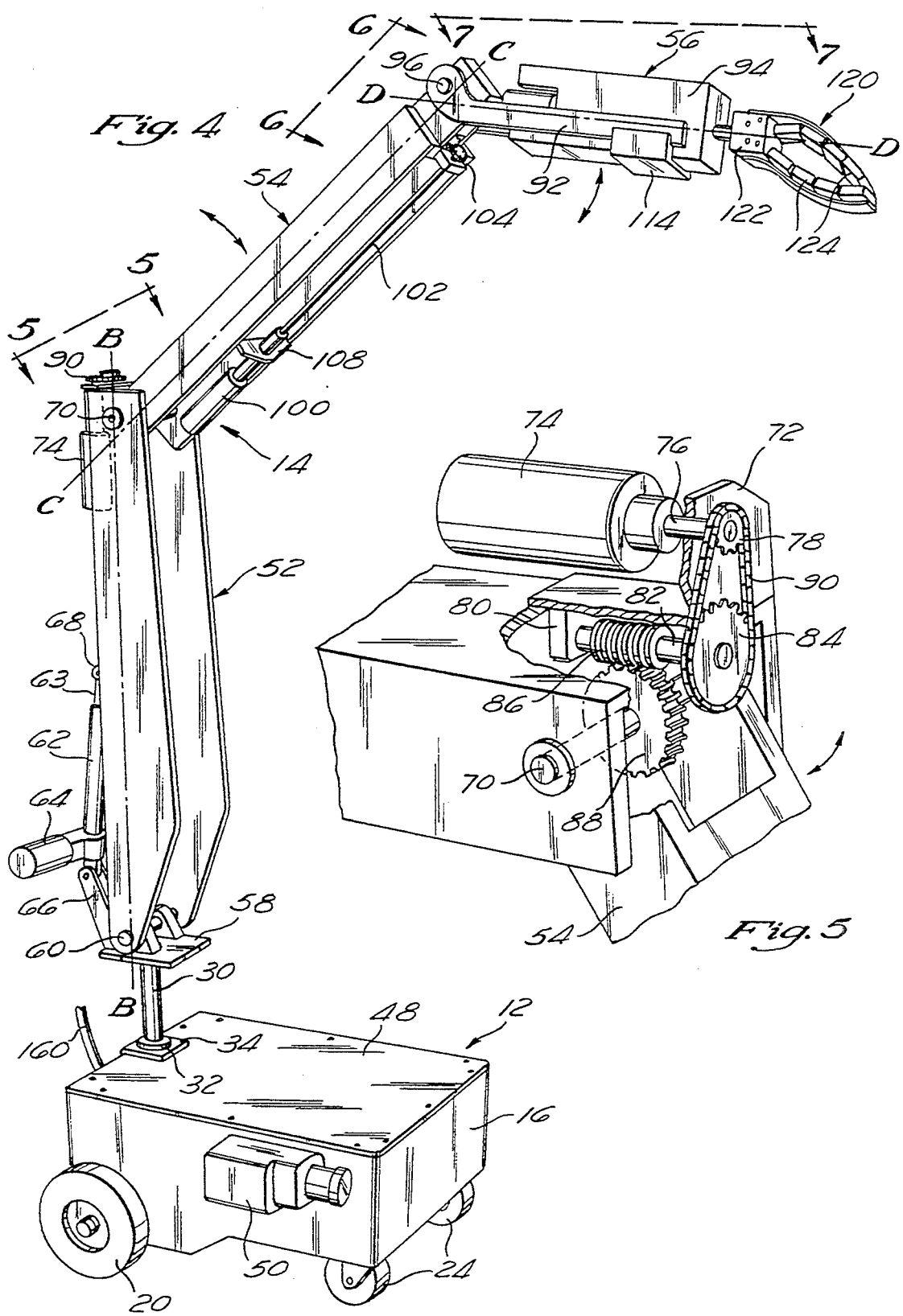

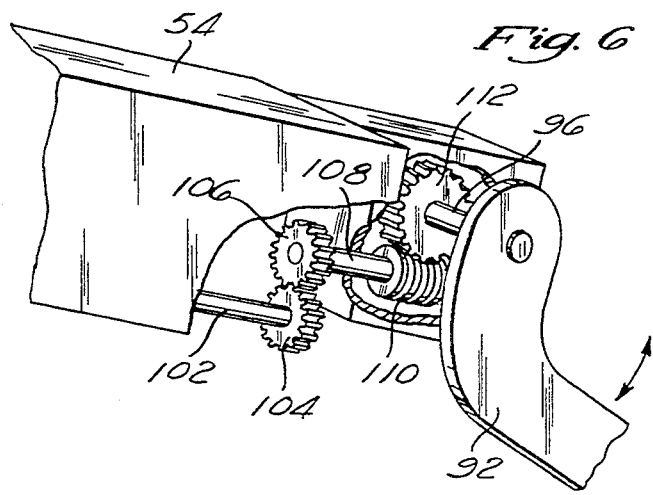
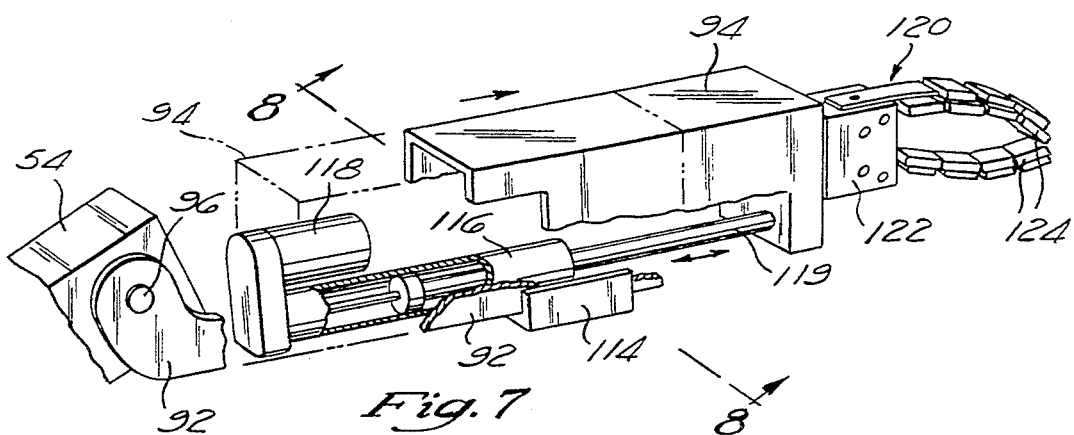
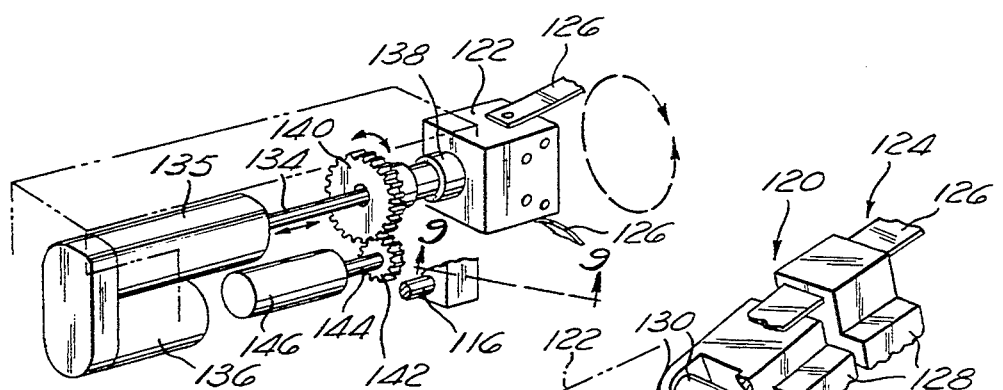
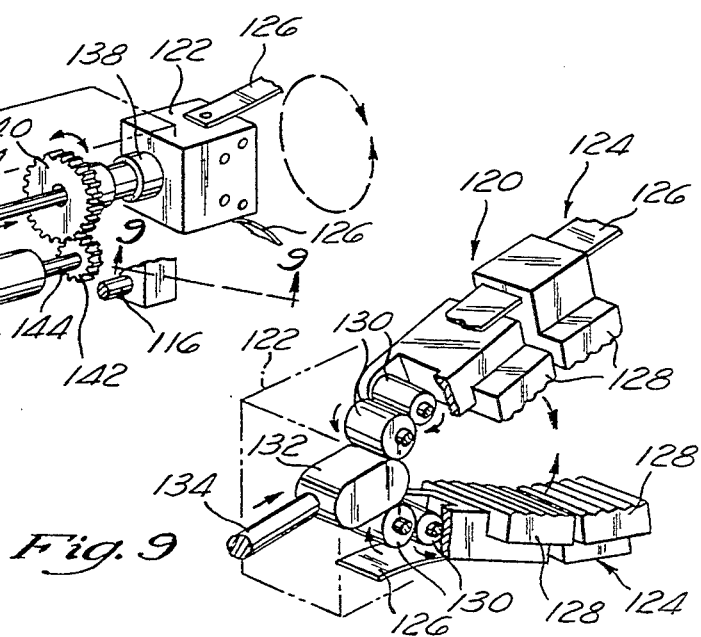

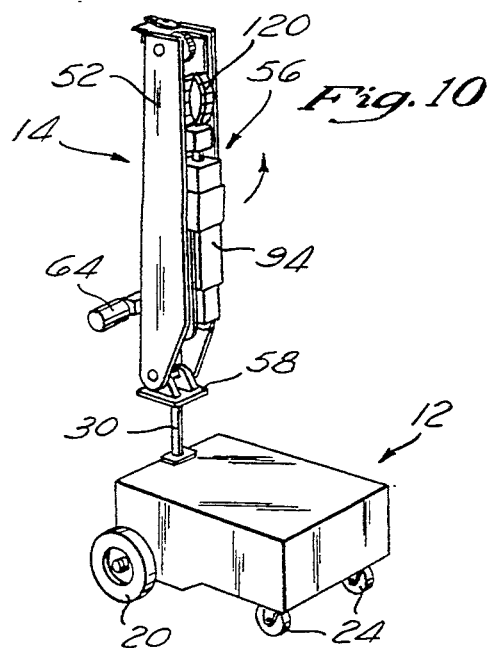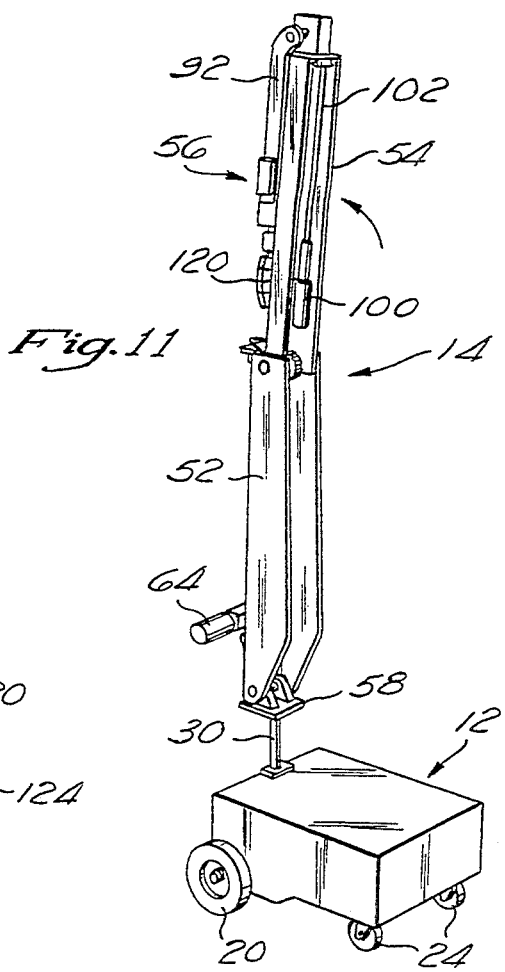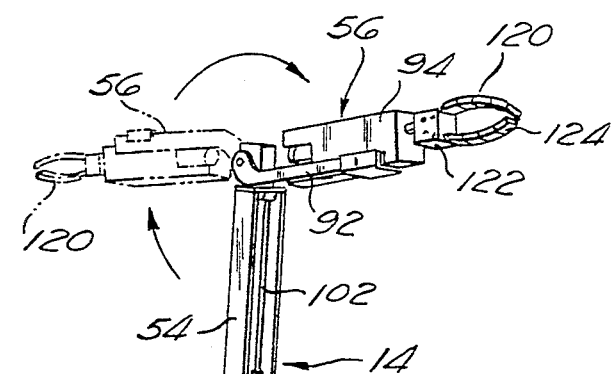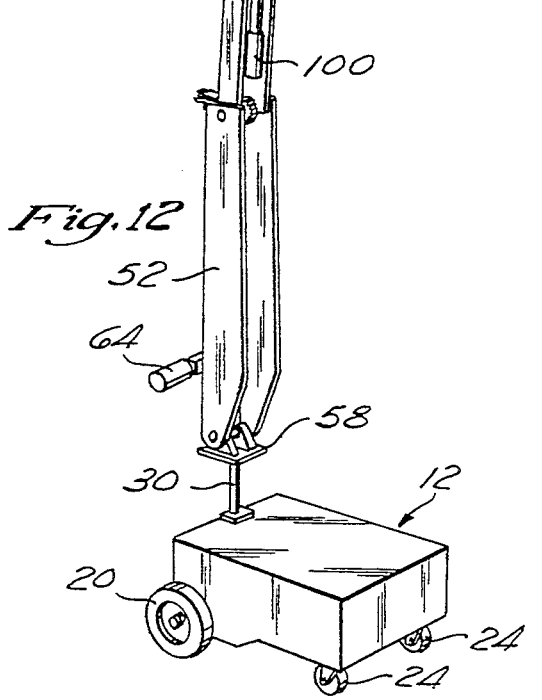

MOBILE ROBOTIC ARM

FIELD OF THE INVENTION

The present invention relates generally to robotic equipment, and more particularly to a mobile robotic arm for grasping objects at low-level, intermediate level, and high reach areas of a domestic dwelling.

BACKGROUND OF THE INVENTION

In a typical domestic dwelling, household items are stored or kept in areas which vary in elevation from the ground level. Though some items are kept in low-level and high reach areas, the majority of items are usually kept at an intermediate level to facilitate easy access thereto. Examples of items typically placed in intermediate level areas of the house include glasses and dishes stored within kitchen cupboards, food items disposed upon storage shelves, linens stored within linen closets, and decorative objects placed upon television sets or within curio cabinets.

Though the aforementioned items are readily accessible to most adult occupants of the dwelling, individuals suffering from certain handicaps, especially those confined to wheelchairs, encounter significant difficulty when attempting to reach those items which are stored at intermediate level and high reach areas of the dwelling. As will be recognized, most individuals confined to wheelchairs do not have an arm reach sufficient to grasp objects stored at intermediate level and high level areas while in a seated position. As a result, these individuals are generally precluded from having full access to all areas within the dwelling and are dependent upon others to gain such access.

The present invention addresses the aforementioned difficulties typically encountered by individuals confined to wheelchairs by providing a mobile robotic arm which is specifically designed to grasp objects at low-level, intermediate level and high reach areas of a domestic dwelling. Though many types of robots are currently known, the vast majority of these robots have been developed for specific industrial applications and are not suited for use within a domestic dwelling. Additionally, those robots which can be placed within a home are usually novelty items and not designed to provide access to low-level, intermediate level, and high reach areas.

SUMMARY OF THE INVENTION

In accordance with the preferred embodiment of the present invention, there is provided a mobile robotic arm for grasping objects at low-level, intermediate level and high reach areas of a domestic dwelling. The mobile robotic arm generally comprises a mobile base having a robotic arm connected thereto which is movable between a collapsed position and various extended positions. In the preferred embodiment, the robotic arm is releasably connected to the base so that it may be easily and quickly removed for maintenance purposes.

The robotic arm itself comprises an elongate lower arm which is rotatably and pivotally connected to the base in a manner wherein the lower arm is selectively articulable to angled orientations of approximately 0 degrees to 90 degrees relative the base. Nested within the lower arm is an elongate mid-arm which is pivotally connected to the lower arm in a manner wherein the mid-arm is selectively articulable to angled orientations of approximately 0 degrees to 180 degrees relative the lower arm. Nested within the mid-arm is an elongate forearm which is pivotally connected to the mid-arm such that the forearm is selectively articulable to angled orientations of approximately 0 degrees to 270 degrees relative the mid-arm.

In the preferred embodiment, the forearm comprises a frame member having one end pivotally connected to the mid-arm. Slidably connected to the frame member is a carriage member which is selectively extensible and retractable relative the frame member when the forearm is not nested within the mid-arm. A gripper is rotatably connected to one end of the carriage member for selectively grasping and releasing household objects. Particularly, the gripper comprises a pair of gripper jaws which are moveable between open and closed positions, the gripper jaws being adapted to conform to the shape of the particular object grasped thereby.

The mobile robotic arm of the present invention further comprises a controller which is electrically configured to independently control the various movements of the base and the robotic arm. Particularly, the controller regulates the rolling movement of the base, the rotation of the lower arm relative the base, the pivotal movement of the lower arm relative the base, the pivotal movement of the mid-arm relative the lower arm, the pivotal movement of the forearm relative the mid-arm, the extension and retraction of the carriage member, the rotation of the gripper, and the opening and the closing of the gripper jaws. The controller may further include a video display screen thereon for displaying images generated by a video camera attached to the base, thereby allowing the user to monitor the movements of the base and robotic arm without necessarily being in the same room in which the arm is being utilized. In the preferred embodiment, both the base and arm are powered by a rechargeable battery disposed within the base.

So as to provide access to objects stored at intermediate levels or at high reach areas within the dwelling, the arm is preferably configured to reach to a height of approximately 8 feet when fully extended. Due to this extension capability, the user is provided access to virtually all areas within the dwelling. Additionally, the controller is configured to be easily and quickly attachable to an arm rest portion of a conventional wheelchair.

BRIEF DESCRIPTION OF THE DRAWINGS

These as well as other features of the present invention will become more apparent upon reference to the drawings wherein:

FIG. 1 is a perspective view of the mobile robotic arm of the present invention;

FIG. 2 is a perspective view of a controller used in conjunction with the present invention;

FIG. 3 is a perspective view of the mobile base comprising the mobile robotic arm;

FIG. 4 is a perspective view illustrating the robotic arm in a partially extended orientation;

FIG. 5 is a partial perspective view of the lower arm component of the robotic arm taken along line 5—5 of FIG. 4;

FIG. 6 is a partial perspective view of the mid-arm component of the robotic arm taken along line 6—6 of FIG. 4;

FIG. 7 is a partial perspective view of the forearm component of the robotic arm taken along line 7—7 of FIG. 4;

FIG. 8 is a perspective view of the gripper drive assembly disposed within the forearm component of the robotic arm taken along line 8—8 of FIG. 7;

FIG. 9 is a partial perspective view of the gripper of the robotic arm taken along line 9—9 of FIG. 8;

FIG. 10 is a perspective view illustrating the movement of the lower arm component relative the base;

FIG. 11 is a perspective view illustrating the movement of the mid-arm component relative the lower arm component;

FIG. 12 is a perspective view illustrating the movement of the forearm component relative the mid-arm component;

FIG. 13 is a perspective view illustrating the movements of a carriage member comprising the forearm component and gripper attached to the carriage member.

DETAILED DESCRIPTION OF THE PREFERRED EMBODIMENT

Figure 14:
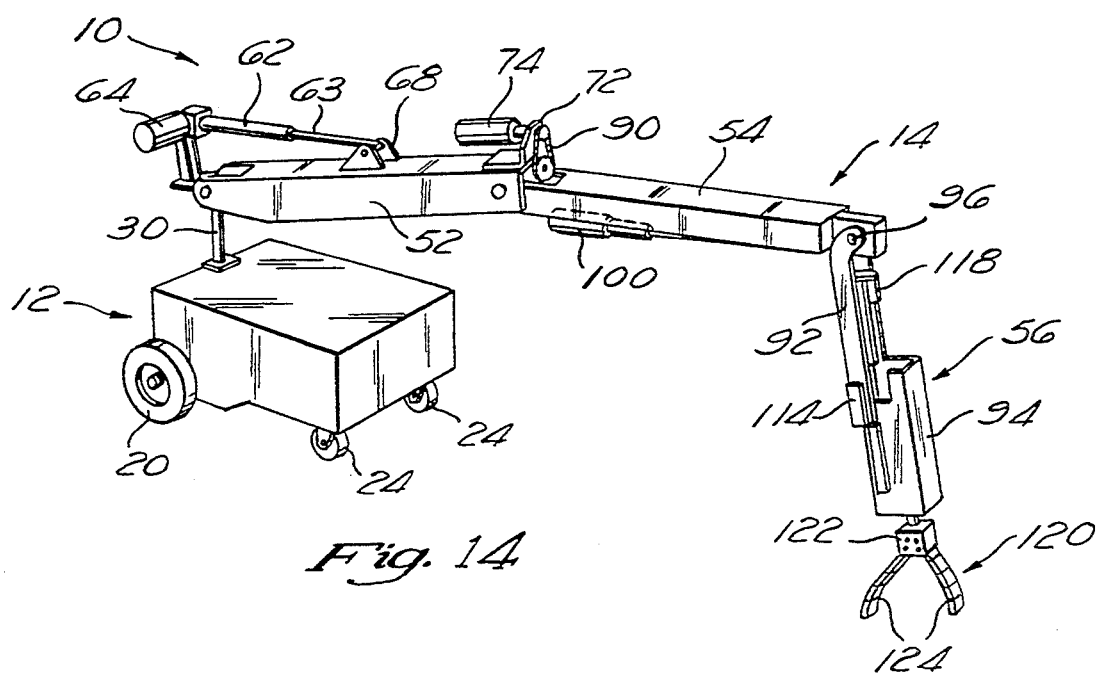
FIG. 14 is a perspective view illustrating the robotic arm as oriented to grasp objects stored at low-level areas.

Referring now to the drawings wherein the showings are for purposes of illustrating a preferred embodiment of the present invention only, and not for purposes of limiting the same, FIG. 1 perspectively illustrates the mobile robotic arm 10 constructed in accordance with the preferred embodiment of the present invention. In the preferred embodiment, mobile robotic arm 10 generally comprises a mobile base 12 having a robotic arm 14 connected thereto.

As best seen in FIGS. 1 and 3, base 12 generally comprises a frame 16 having a generally rectangular configuration and defining two longitudinal sides and two lateral sides. Frame 16 is preferably constructed from stainless steel though other materials may be utilized as an alternative. Disposed within the frame 16 is a battery 18 which is used to provide power to the various motors disposed within the base 12 and arm 14. In the preferred embodiment, the battery 18 is rechargeable and adapted to have a charge capacity substantially equivalent to batteries used in conjunction with conventionally known, electrically powered wheelchairs. Extending outwardly from each of the longitudinal sides of the frame 16 are drive wheels 20, each of which are independently driven by a respective drive motor 22 electrically interfaced to battery 18. Disposed adjacent the lateral side 16a of frame 16 which is furthest from drive wheels 20 are guide wheels 24. Though not independently powered, guide wheels 24 are rotatably connected to frame 16 thereby aiding in the maneuverability of the mobile robotic arm 10 throughout the various rooms of the domestic dwelling. Attached to the outer surface of the lateral side 16a and portions of the longitudinal sides of frame 16 is a continuous layer of cushioning material 26. As can be appreciated, cushioning material 26 is used to prevent damage to any walls or other objects within the dwelling when the mobile robotic arm 10 is inadvertently caused to collide with such walls or objects. Also disposed within the frame 16 is a central processor 28 which is used to transmit signals to the various components comprising the mobile robotic arm 10 in a manner which will be described in greater detail below.

In the preferred embodiment, the robotic arm 14 is rotatably connected to the mobile base 12 via a shaft member 30. As seen in FIG. 3, shaft member 30 is rotatably interfaced to the frame 16 of base 12 through the utilization of a bracket 32 which is rigidly attached to the lateral side 16b of frame 16 adjacent the drive wheels 20. Disposed within bracket 32 is a bearing 34 into which shaft member 30 is rotatably received. The lower end of shaft member 30 is rigidly connected to a downwardly extending second shaft 36 having a diameter slightly less than the diameter of shaft member 30. Second shaft 36 extends through one end of and is rigidly attached to an elongate lever member 38. The end of lever member 38 opposite that attached to second shaft 36 is pivotally interfaced to a rod 40 which extends outwardly from a lead screw actuator 42. Lead screw actuator 42 is driven by a motor 44 attached adjacent the end thereof opposite that connected to lever member 38 and is operable to reciprocally actuate rod 40. As will be recognized, the outward actuation of rod 40 is operable to pivot lever member 38 in a direction toward the lateral side 16b of frame 16. Due to the rigid attachment of lever member 38 to second shaft 36, such actuation of lever member 38 toward the lateral side 16b causes shaft member 30 to rotate in the direction designated by the arrow shown in FIG. 3, i.e. a clockwise direction. Conversely, inward actuation of the rod 40 causes the lever member 38 to pivot in a direction toward the lead screw actuator 42, thus causing the shaft member 30 to rotate in a counterclockwise direction. In the preferred embodiment, the stroke of rod 40 is specifically limited such that the shaft member 30 may rotate a maximum of ±20 degrees relative a horizontal axis A—A extending through base 12. The purpose of such limited rotation will be explained in greater detail below. Importantly, to facilitate the rotational movement of the shaft member 30 a full 20 degrees in the clockwise direction, the lever member 38 must be pivoted to a position by the rod 40 which extends beyond the inner surface of lateral side 16b of the frame 16. As such, to accommodate the lever member 38, an elongate opening 46 is provided within the lateral side 16b to provide clearance for the lever member 38 when such is pivoted outwardly by the outward actuation of rod 40. Though in the preferred embodiment, lead screw actuator 42 and rod 40 are used to selectively pivot lever member 38 and hence rotate shaft member 30, it will be appreciate that other devices such as pneumatically or hydraulically actuated cylinders may be utilized as an alternative. The lead screw actuator 42, motor 44, lever member 38, and second shaft 36 are all preferably disposed within the frame 16. These components, in addition to the battery 18, central processor 28, and motors 22 are preferably enclosed within the frame 16 by a sheet 48 rigidly attached to the upper surface thereof. Attached to the outer surface of one of the longitudinal sides of frame 16 is a video camera 50. The use of video camera 50 will be explained in greater detail below.

Referring now to FIG. 4, robotic arm 14 generally comprises a lower arm component 52, a mid-arm component 54, and a forearm component 56, all of which are pivotally interconnected. In the preferred embodiment, robotic arm 14 is connected to mobile base 12 through the attachment of the elongate lower arm 52 to the upper end of the shaft member 30. Importantly, lower arm 52 is pivotally connected to shaft member 30 via a bracket 58 disposed upon the upper end of shaft member 30. In this respect, lower arm 52 is placed upon bracket 58 such that a pivot pin 60 may be used to pivotally interconnect lower arm 52 and bracket 58. As will be recognized, since bracket 58 serves to directly interface lower arm 52 to shaft member 30, the rotation of shaft member 30 will cause the concurrent rotation of the lower arm 52 and hence the robotic arm 14.

Through the pivotal connection facilitated by pivot pin 60, lower arm 52 is selectively articulable to angled orientations of approximately 0 degrees to 90 degrees relative the axis A—A extending through base 12. In this respect, when the robotic arm 14 is in its fully retracted position, lower arm 52 assumes an angled orientation of approximately 0 degrees relative axis A—A as seen in FIG. 1. When angled at 90 degrees relative axis A—A, lower arm 52 assumes the orientation seen in FIGS. 4 and 10–12, while FIG. 14 illustrates lower arm 52 in an angled orientation between 0 degrees and 90 degrees. To articulate lower arm 52 through its angular range of motion, attached thereto is a lead screw actuator 62 having a rod 63 extending therefrom. Lead screw actuator 62 is driven by a motor 64 disposed on one end thereof. As best seen in FIG. 4, the end of lead screw actuator 62 adjacent motor 64 is pivotally connected to an extension 66 extending angularly upwardly from bracket 58, with the distal end of rod 63 being pivotally connected to a mount 68 rigidly attached to the mid-portion of lower arm 52. When rod 63 is actuated outwardly, i.e. away from motor 64, lower arm 52 is caused to move angularly downward toward base 12. Thus, when rod 63 reaches its full outward stroke, lower arm 52 will be oriented at approximately 0 degrees relative axis A—A. Conversely, as rod 63 is actuated inwardly, i.e. toward motor 64, lower arm 52 is caused to move angularly upward away from base 12. As such, when rod 63 reaches its full inward stroke, lower arm 52 will be angularly oriented at approximately 90 degrees relative axis A—A.

Pivotally connected to the end of lower arm 52 opposite that connected to bracket 58 is the mid-arm 54. Such pivotal connection is facilitated by a pivot pin 70 which interconnects lower arm 52 and mid-arm 54. In the preferred embodiment, mid-arm 54 is sized and configured so as to be nestable within lower arm 52. Thus, as seen in FIG. 10, when lower arm 52 is initially actuated during the extension of the robotic arm 14, mid-arm 54 is disposed therewithin. Importantly, the pivotal connection of mid-arm 54 to lower arm 52 facilitated by pivot pin 70 allows mid-arm 54 to be selectively articulable to angled orientations of approximately 0 degrees to 180 degrees relative an axis B—B extending longitudinally through lower arm 52.

Referring now to FIGS. 4 and 5, to facilitate the angular movement of mid-arm 54 relative lower arm 52, attached to lower arm 52 via a mount 72 is a motor 74. Motor 74 includes a drive shaft 76 extending outwardly therefrom which terminates at its distal end with a sprocket 78. Rotatably connected to a mount 80 rigidly attached to and extending from lower arm 52 is a shaft 82 which, like shaft 76, has a sprocket 84 disposed on its distal end. Additionally, disposed upon shaft 82 between mount 80 and sprocket 84 is a worm gear 86. Worm gear 86 is oriented upon shaft 82 so as to cooperate with a gear 88 disposed upon and rigidly attached to the central portion of pivot pin 70. Importantly, sprockets 78 and 84 are oriented relative lower arm 52 so as to be interconnectable by a drive chain 90 such that rotation of the drive shaft 76 via the motor 74 will cause a subsequent rotation of the worm gear 86 and hence the gear 88. Though not fully shown, pivot pin is rotatably interfaced to lower arm 52 but rigidly secured to mid-arm 54. As such, as gear 88 rotates due to the rotation of worm gear 86, pivot pin 70 will rotate within lower arm 52 and cause the movement of mid-arm 54 due to its rigid connection thereto.

Pivotally connected to the end of mid-arm 54 opposite that connected to lower arm 52 is the forearm 56. In the preferred embodiment, forearm 56 is sized and configured to be nestable within mid-arm 54. As seen in FIG. 11, mid-arm 54 may be removed from is nested orientation within lower arm 52 with forearm 56 remaining nested within mid-arm 54. Referring now to FIGS. 4, 6 and 7, in the preferred embodiment, forearm 56 comprises a frame member 92 having a carriage member 94 slidably mounted thereto. The pivotal connection between forearm 56 and mid-arm 54 is facilitated by a pivot pin 96 which is used to interconnect one end of frame member 92 to mid-arm 54. As seen in FIG. 12, the pivotal connection of forearm 56 to mid-arm 54 facilitated by pivot pin 96 allows forearm 56 to be selectively articulable to angled orientations of approximately 0 degrees to 270 degrees relative an axis C—C extending longitudinally through mid-arm 54. To facilitate such pivotal movement, attached to mid-arm 54 via a mount 98 is a motor 100. Extending outwardly from the motor 100 is a shaft 102 having a gear 104 disposed on the distal end thereof. Gear 104 is cooperatively engaged to a gear 106 which is disposed on the distal end of a shaft 108 rotatably connected to the end of mid-arm 54 attached to frame member 92. Disposed upon the mid-portion of shaft 108 is a worm gear 110 which is cooperatively engaged to a gear 112 disposed upon and rigidly attached to the mid-portion of pivot pin 96. Importantly, pivot pin 96 is rotatably interfaced to mid-arm 54 with the opposed ends thereof being rigidly connected to frame member 92 of forearm 56. As such, the rotation of pivot pin 96 via the rotation of gear 112 will cause the corresponding movement of forearm 56.

As previously indicated, in constructing forearm 56, carriage member 94 is slidably interfaced to frame member 92. Particularly, carriage member 94 is received into a correspondingly shaped channel member 114 rigidly secured to frame member 92. In the preferred embodiment, carriage member 94 is selectively extensible and retractable relative frame member 92 and channel member 114 along an axis D—D which extends longitudinally through frame member 92. Such extension and retraction of carriage member 94 is facilitated by a lead screw actuator 116 which is driven by a motor 118 interfaced thereto and includes a rod 119 extending therefrom. The end of lead screw actuator 116 adjacent motor 118 is rigidly connected to frame member 92 with the distal end of rod 119 being attached to carriage member 94. As seen in FIG. 7, as rod 119 is actuated outwardly, i.e. away from motor 118, carriage member 94 is likewise caused to move outwardly. Conversely, as rod 119 is actuated inwardly, i.e. toward motor 118, carriage member 94 is likewise caused to move inwardly. As previously indicated, carriage member 94 moves in a direction parallel to the axis D—D extending longitudinally through frame member 92.

Referring now to FIGS. 7–9, attached to forearm 56 on the end opposite that pivotally connected to mid-arm 54 is a gripper assembly 120. In the preferred embodiment, gripper assembly 120 generally comprises a gripper base 122 having a pair of gripper jaws 124 extending outwardly therefrom. In the preferred embodiment, each of gripper jaws 124 is adapted to conform to the shape of the object to be grasped by the gripper assembly 120. Particularly, each of the gripper jaws 124 generally comprises a flexible band 126 having a plurality of gripper pads 128 attached thereto. The object contacting surfaces of the gripper pads 128 preferably have a serrated configuration to aid their gripping characteristics.

To selectively grasp and release objects, the gripper jaws 124 are moveable between a grasping position, shown in FIG. 7, and a releasing position, shown in FIG. 9. To facilitate the movement of the gripper jaws between these positions, attached to the ends of the gripper jaws 124 connected to the base 122 are pairs of roller members 130. In the preferred embodiment, each of the pairs of roller members 130 are interfaced to a cam member 132 disposed on the distal end of a rod 134 extending from a lead screw actuator 135. The distal end of the rod 134 and cam member 132 are disposed within the gripper base 122. The end of lead screw actuator 135 opposite that connected to cam member 132 is secured within the interior of carriage member 134 and is driven by a motor 136 attached immediately adjacent thereto. Gripper base 122 is attached to carriage member 94 via a bearing 138 which allows base 122 to be rotated relative carriage member 134 but prevents any other movement of base 122 from occurring. As such, when rod 134 is actuated outwardly, i.e. away from motor 136, cam member 132 is forced between the pairs of roller members 130 thereby causing the gripper jaws 124 to assume the releasing position shown in FIG. 9. Conversely, as rod 134 is actuated inwardly, i.e. toward motor 136, the cam member 132 is pulled from between roller members 130 thereby causing the gripper jaws 124 to assume the grasping position shown in FIG. 7. Importantly, the gripper jaws 124 are normally biased toward the grasping position by the action of the flexible bands 126 which are rigidly secured to the gripper base 122.

As previously indicated, bearing 138 is adapted to allow gripper base 122 and hence jaws 124 to be rotated relative carriage member 94. In this respect, disposed on the end of bearing 138 opposite that connected to base 122 is a gear 140 through which rod 134 extends. Gear 140 is cooperatively engaged to a gear 142 disposed on the distal end of a shaft 144 extending outwardly from a motor 146 which is secured within the interior of carriage member 94. As will be recognized, the rotation of shaft 144 via motor 146 will cause the subsequent rotation of the base member 122 as seen in FIG. 8. Additionally, since rod 134 extends through but is not attached to gear 140, base 122 and gripper jaws 124 may be rotated irrespective of whether the gripper jaws 124 are in the grasping position or releasing position.

Referring now to FIG. 2, the mobile robotic arm 10 of the present invention further comprises a control box 148 for controlling the various movements of the mobile base 12 and robotic arm 14. Control box 148 is interfaced to a transmitter 150 via a wire 152. In the preferred embodiment, the movements of the base 12 and robotic arm 14 are controlled via radio waves which emanate from transmitter 152. Importantly, control box 148 is sized and configured to be interfaced to the arm rest portion of a conventional wheelchair. As such, the control box 148 is adapted to be easily accessible to the wheel chair occupant for purposes of controlling the movements of the base 12 and robotic arm 14.

In the preferred embodiment, the central processor 28 disposed within base 12 is adapted to receive the radio transmissions from transmitter 152 and to convert such transmissions to electrical signals which are operable to control the various movements of the mobile robotic arm 10. Disposed upon an outer surface of control box 148 are an on/off switch 154, a control lever 156, and a plurality of switches 158. The particular movements of the robotic arm 14 are controlled through the manipulation of the control lever 156 in conjunction with the selective actuation of the switches 158. In this respect, control box 148 is electrically configured to independently control the rolling movement of the base 12, the rotation of the lower arm 52 relative the base 12, the pivotal movement of the lower arm 52 relative the base 12, the pivotal movement of the mid-arm 54 relative the lower arm 52, the pivotal movement of the forearm 56 relative the mid-arm 54, the extension and retraction of the carriage member 94 relative frame member 92, the rotation of the gripper base 122 and the opening and closing of the gripper jaws 124. Though not shown, control box 148 may further include a video display screen thereon for receiving video transmissions generated by the video camera 50 attached to the base 12. Thus, through the utilization of the video camera 50 and associated display screen upon the control box 148, the user may operate the mobile robotic arm 10 in locations remote from the user.

As previously indicated, the mobile robotic arm 10 of the present invention is adapted to grasp objects at low-level, intermediate level and high reach areas of a domestic dwelling. When in its fully retracted position, the control arm 14 assumes the position shown in FIG. 1. To grasp low-level objects, the robotic arm 14 assumes a position similar to that as shown in FIG. 14. To grasp objects stored at intermediate levels, the robotic arm 14 assumes an orientation similar to that shown in FIG. 4. Finally, to grasp objects stored in high reach areas of the dwelling, the robotic arm 14 assumes a position similar to that shown in FIG. 12. In the preferred embodiment, the robotic arm 14 is adapted to extend vertically upwardly a height not exceeding approximately eight feet as measured from the top of frame 16 to the distal ends of the gripper jaws 124. Thus, the robotic arm 14 is able to obtain access to virtually all areas within the domestic dwelling. Due to the nesting of the forearm 56 within mid-arm 54 and mid-arm 54 within lower arm 52, when robotic arm 14 is disposed in the retracted position shown in FIG. 1, a minimum amount of space is occupied thereby. As previously specified, robotic arm 14 is preferably limited to ±20 degrees rotation relative axis A—A extending through base 12. In this regard, due to the extension capacity of arm 14, if the rotation thereof were to exceed the aforementioned limits, base 12 would be prone to tip on one of its longitudinal sides due to the moment created by the weight of the arm 14 when horizontally extended.

Each of the motors utilized in conjunction with the mobile robotic arm 10 of the present invention are powered by the rechargeable battery 18 disposed within the base 12. Power is transmitted from the battery 18 to the various motors via an electrical line 160 as seen in FIGS. 1 and 4. It will be appreciated that as an alternative to the various lead screw actuators and motors utilized in conjunction with the mobile robotic arm 10 of the present invention, components such as hydraulically or pneumatically actuated cylinders may be used to facilitate the various movements of the components.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A mobile robotic arm for grasping objects at low-level, intermediate level and high reach areas of a domestic dwelling, comprising:

a mobile base defining a horizontal axis extending therethrough;

an elongate lower arm having a proximal end, a distal end and defining a first axis extending longitudinally therethrough, said lower arm having a channel formed therein, said proximal end being rotatably and pivotally connected to said base in a manner wherein said lower arm is selectively articulable to angled orientations of approximately 0 degrees to 90 degrees relative said horizontal axis;

an elongate mid-arm received within the channel of said lower arm such that said mid-arm is nested within said lower arm along said first axis, said mid-arm having a first end, a second end, and defining a second axis extending longitudinally therethrough, said first end being pivotally connected to said distal end of said lower arm in a manner wherein said mid-arm is selectively articulable to angled orientations of approximately 0 degrees to 180 degrees relative said first axis;

an elongate forearm disposed along side of said mid-arm along said second axis, said forearm having a front end, a back end, and defining a third axis extending longitudinally therethrough, said back end being pivotally connected to said second end of said mid-arm in a manner wherein said forearm is selectively articulable to angled orientations of approximately 0 degrees to 270 degrees relative said second axis; and a gripper rotatably connected to said front end of said forearm for selectively grasping and releasing objects;

said gripper includes:

(a) a base;
   (b) two flexible bands attached to said base;
   (c) a plurality of gripper pads disposed along said flexible bands, said flexible bands and said gripper pads defining gripper jaws, said gripper jaws having a releasing position and a grasping position, said flexible bands urging said gripper jaws into the grasping position;
   (d) a cam disposed within said base; and
   (e) at least one roller member cooperating with each of said flexible bands such that urging said cam intermediate said roller members moves said gripper jaws to the releasing position thereof against the urging of said flexible bands and such that withdrawing said cam from between said rollers allows said flexible bands to urge said gripper jaws into the grasping position thereof.

2. The device of claim 1 wherein said forearm comprises:

a frame member pivotally connected to said second end of said mid-arm; and a carriage member slidably mounted to said frame member, said carriage member being selectively extensible and retractable relative said frame member along said third axis, said gripper being rotatably connected to said carriage member.

3. The device of claim 2 further comprising a controller, said controller being electrically connected to driving means to independently control the movement of said base, the rotation of said lower arm relative said base, the pivotal movement of said lower arm relative said base, the pivotal movement of said mid-arm relative said lower arm, the pivotal movement of said forearm relative said mid-arm, the extension and retraction of said carriage member, the rotation of said gripper, and the opening and closing of said gripper jaws.

4. The device of claim 3 wherein said base includes a video camera mounted thereto.

5. The device of claim 1 further comprising lever means connected between said arm and said base for limiting the rotational movement of said lower arm relative said base to approximately ±20 degrees from said horizontal axis.

6. The device of claim 1 wherein said mobile robotic arm is powered by a rechargeable battery disposed within said base.

* * * * *